Feb. 21, 1956 E. J. LATTNER ET AL 2,735,587
MATERIAL DISTRIBUTING MEANS
Filed April 20, 1953 4 Sheets-Sheet 1
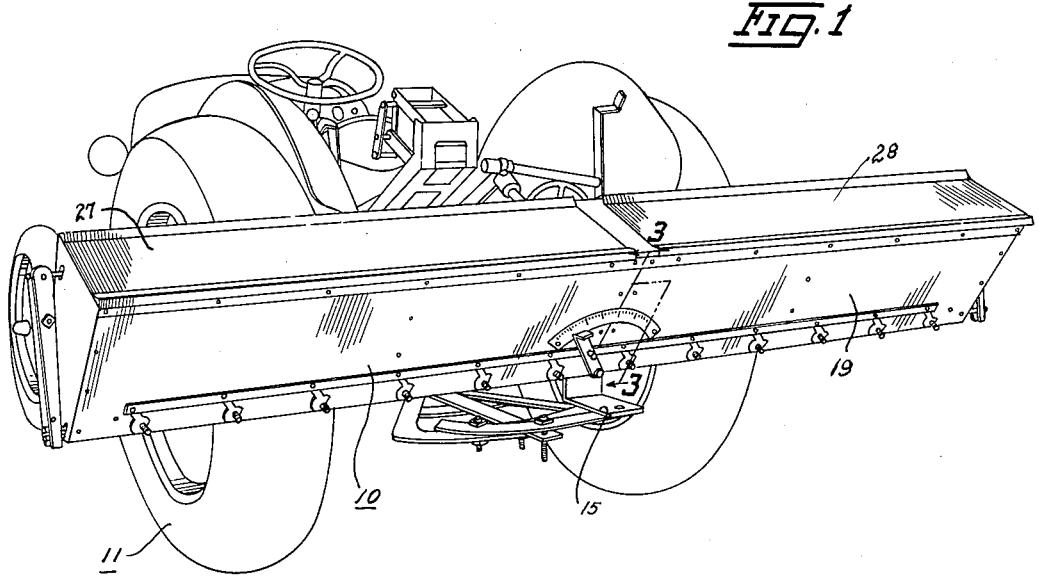
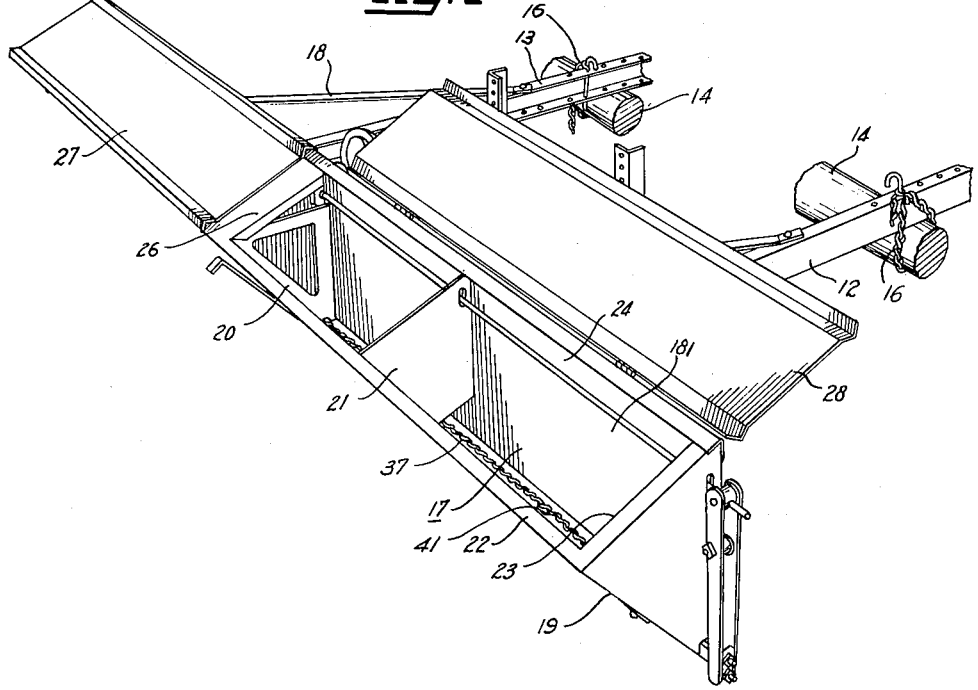
INVENTORS.
EMERT J. LATTNER
HAROLD H. MCLELAND
BY Flournoy Corey
ATTORNEY.

Feb. 21, 1956    E. J. LATTNER ET AL    2,735,587
MATERIAL DISTRIBUTING MEANS
Filed April 20, 1953    4 Sheets-Sheet 2

INVENTORS.
EMERT J. LATTNER
HAROLD H. McLELAND
BY Flourroy Corey
ATTORNEY.

Feb. 21, 1956  E. J. LATTNER ET AL  2,735,587
MATERIAL DISTRIBUTING MEANS
Filed April 20, 1953  4 Sheets-Sheet 3
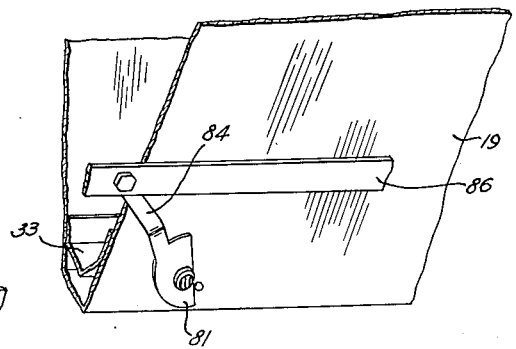
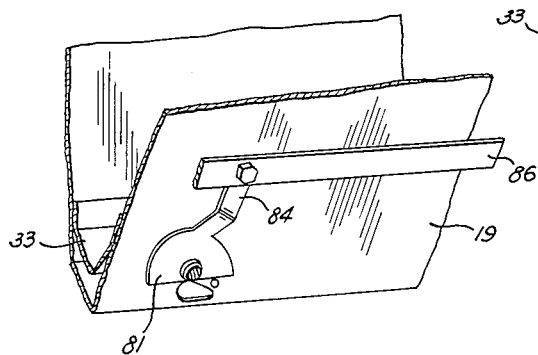
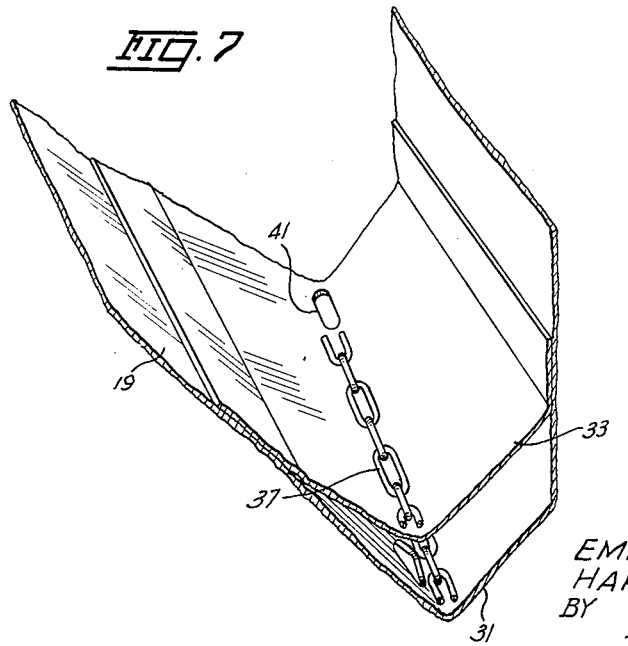
INVENTORS.
EMERT J. LATTNER
HAROLD H. MCLELAND
BY
*Flournoy Corey*
ATTORNEY.

Feb. 21, 1956  E. J. LATTNER ET AL  2,735,587
MATERIAL DISTRIBUTING MEANS
Filed April 20, 1953  4 Sheets-Sheet 4
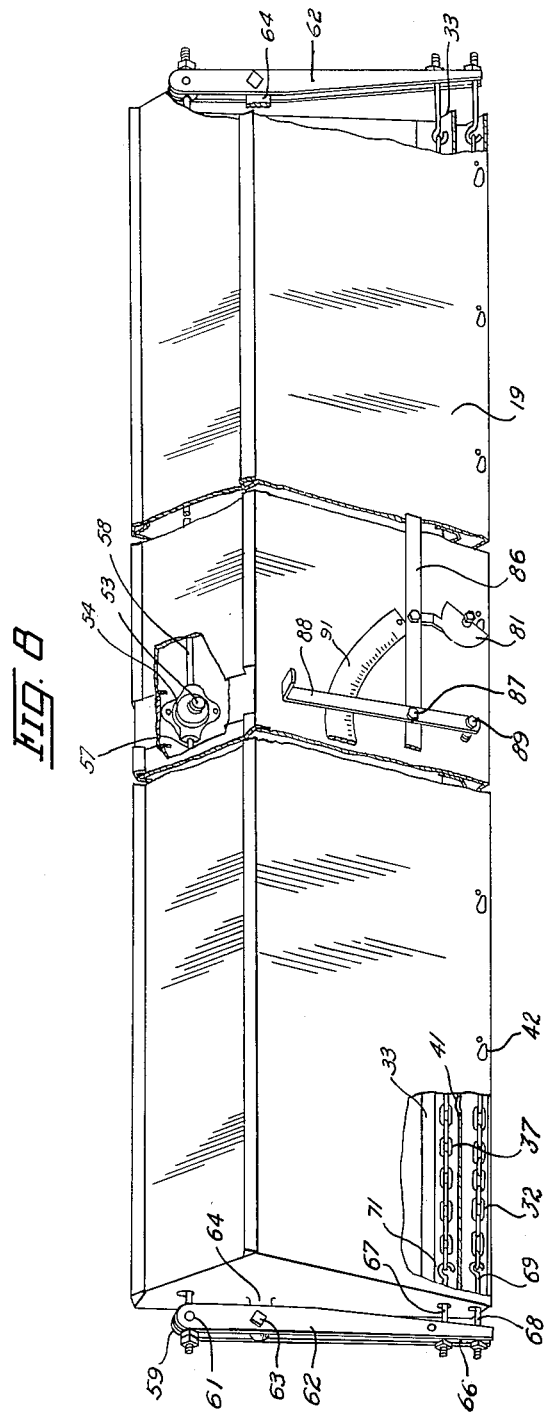
INVENTORS.
EMERT J. LATTNER
HAROLD H. MCLELAND
BY
*Flournoy Corey*
ATTORNEY.

United States Patent Office 2,735,587
Patented Feb. 21, 1956

2,735,587
MATERIAL DISTRIBUTING MEANS

Emert J. Lattner and Harold H. McLeland, Cedar Rapids, Iowa, assignors to Century Engineering Corporation, Cedar Rapids, Iowa, a corporation of Iowa Application April 20, 1953, Serial No. 349,894

5 Claims. (Cl. 222—267)

This invention relates to farm machinery and has particular relation to seeders for sowing seed, and more particularly to seeders of this type adapted to be mounted on and driven by a farm tractor, or adapted to be mounted on other farm implements which are towed and driven by a farm tractor.

In most of the seeders known to the art, power for driving the seeder was furnished by a land wheel or one or both of the wheels on which the seeder was mounted. This meant that the speed of operation of the seeder was in direct proportion to its linear speed over the ground. Thus, whether the seeder was moving fast or slowly, it was not too difficult to secure approximately the same quantity of seed per square foot of area.

In the present invention, however, and in order to minimize the mechanism needed, and since we are considering a seeder in which mechanical means is used to agitate and expel the seed, it is desirable that the seeder be driven by the same means used to pull it over the ground. However, in pulling and driving the seeder with a tractor, the speed of operation of the distributing mechanism may be higher as the seeder passes over the ground in accordance with the relation of the speed of the motor with the speed of rotation of the driving gears. For instance, in high tractor gear, the speed of operation of the seeder in relation to its rate of movement of translation would be much less than if the tractor were in low gear.

One of the objects of our invention is to overcome this difficulty of operation of a seeder by the tractor which drives it, and to secure approximately the same spread of seed per unit of area regardless of whether the tractor is in low, intermediate or high gear.

Still another object of our invention is to provide a seeder in which the output of the seeder is not in direct proportion to the acceleration or deceleration of the power take-off speed, but the coverage is in direct proportion to the forward speed of the tractor.

Still another object of our invention is to provide a seeder which is less bulky, cleaner, and more practical than the seeders of the prior art.

Still another object of our invention is to provide a seeder which stops the distribution of seed immediately when the power is cut off to the seeder.

Still another object of our invention is to provide a chain type seeder which, even if the chain becomes twisted, will continue to function and deliver substantially the same amount of seed.

Still another important object of our invention is to provide a seeder in which the difference in pressure head, as for instance between a full and an almost empty hopper, will produce little or no variation in the rate of delivery of seed and to also provide for substantially instantaneous cut off.

Still another important object of the invention is to provide, in a seeder, a feeding and distributing system and form which has a high degree of flexibility in sowing the many different grains and seeds, as for instance hairy vetch, Brome grass, oats and other light seeds, timothy, clover, rape, orchard grass, canary grass, soy beans, oats plus mixtures of these grasses and seeds, as well as soy mill organite, pelletized and other types of fertilizer.

A feature of a machine constructed according to our invention is that it employs a vertically extending front wall for the hopper, and a slanting or sloping rear wall, and the final openings of particular shape are placed in a sloping wall, as is hereinafter more particularly described.

Still another object of our invention is to provide a new and novel, multiple distributing and metering structure and system which may be readily adjusted so that all orifices at any given setting will present identical sized and shaped openings.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a view in perspective in rear quartering view of a seeder constructed according to one embodiment of our invention as it appears when mounted directly on a tractor.

Figure 2 is a view in perspective of the seeder with one lid thereof open and illustrating some of the interior structure of the seeder.

Figure 5 is a view in perspective of a fragment of the rear wall of the seeder and one of the valves with the valve shown in open relation.

Figure 6 is a view in perspective of a fragment of the rear wall of the seeder and one of the valves with the valve in closed relation.

Figure 7 is a view in perspective of a fragment of the bottom and false bottom of the seeder and illustrating the position of the chains and openings, and Figure 8 is a view in diagrammatic form of the seeder and the driving parts thereof.

Figure 3:
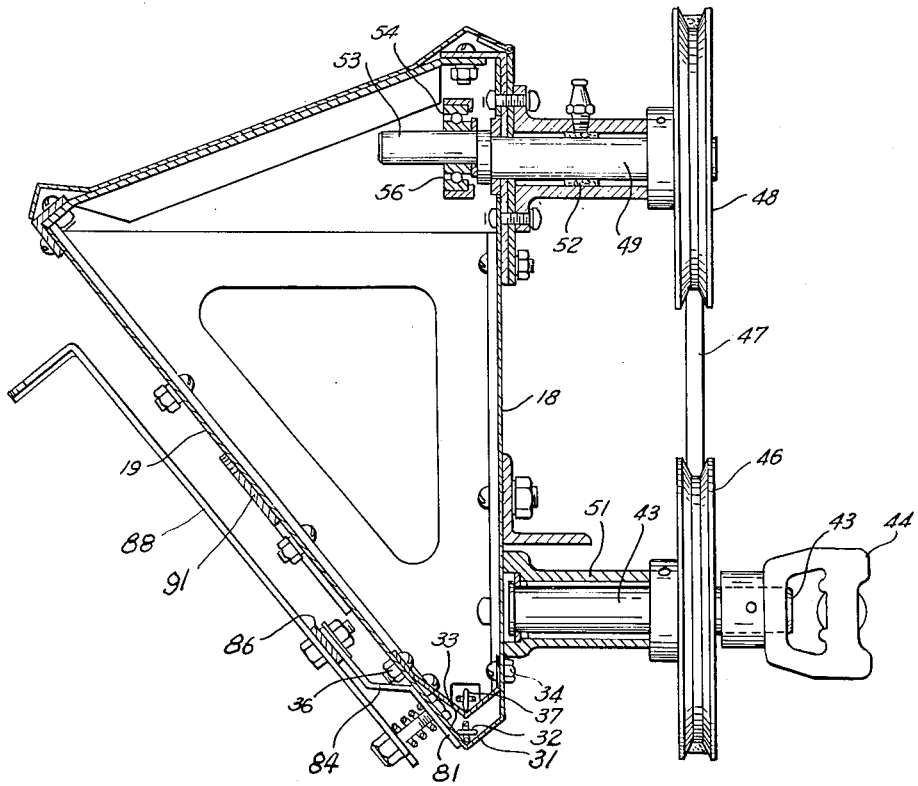
Figure 3 is a view in section of the hopper and operating parts of the seeder, with the drive pulleys and drive shaft shown in elevation.
Figure 4:
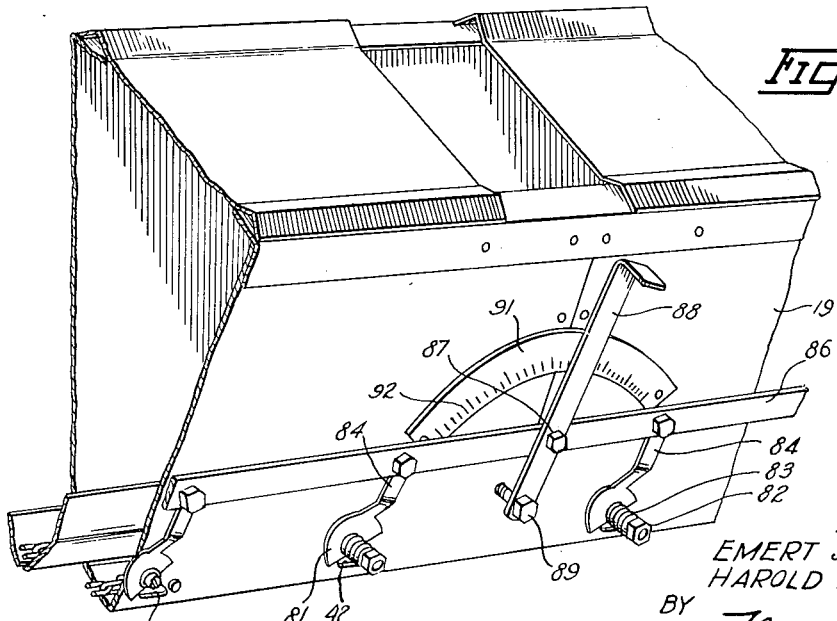
Figure 4 is a fragmentary view in elevation of the hopper of the seeder and showing several of the metering valves and the metering control element, as well as illustrating the location of the chains within the bottom of the hopper and the false bottom of the hopper.

Referring now to the drawings:

In Figure 1 we have shown a preferred embodiment of the seeder 10 as it appears when mounted on the conventional tractor 11 at the rear thereof. The seeder box, in this embodiment of the invention, is a long transversely extending hopper mounted by means of supporting beams 12 and 13 on the back of the tractor. The beams are secured to the axle 14 by means of chains or the like, illustrated at 16, and the beams 12 and 13 are secured to the front wall 17 of the seeder and braced by means of braces such as illustrated at 18. The seeder also is supported by a bracket 15 on the tractor tow bar.

The box or hopper of the seeder is preferably formed of a vertical front wall, such as illustrated at 181, and an inwardly and forwardly extending rear wall 19. Stiffeners, such as illustrated at 20 and 21, stiffen the structure, and flanges 22, 23, 24 and 26 also stiffen the hopper.

The box or hopper is preferably covered by two lids, such as illustrated at 27 and 28. These lids are hinged at the forward edge thereof and slope slightly to shed rain.

The junction of the vertical front wall 181 and the sloping back wall 19 is provided with a narrow upwardly and forwarding extending flange 31 so that the flange or trough strip 31 and the rear wall 19 form a V-shaped bottom in which the lower chain 32 may be located. A false bottom 33 also of V shape is disposed within the hopper and supported in place by means of bolts 34 and 36 to form a V-shaped false bottom for supporting the seed and the upper chain 37. This structure is shown in enlarged relation in Figure 7.

A plurality of spaced openings 41 are provided in the bottom of the false bottom 33 and these openings may be round or rectangular or any desired shape. Another series of approximately triangular openings 42 are provided in the rear wall 19 of the hopper at a position very close to the bottom thereof, and these openings face rearwardly so that they may be readily controlled by means of a valve structure hereinafter described.

It is to be noted that the opening 42 is approximately triangular in shape with the divergent ends of two sides of the triangle joining by a curved portion. This curved triangular opening has a peculiar significance in our seeder construction in that regulation of the rate of flow of the seed is more readily obtained by means of this shape of opening. The relation of the openings in staggered relation is illustrated in Figures 7 and 8. The bottom openings are spaced at such a distance transversely from the upper openings, that the angle of repose of the seed is greater than the slope of the line connecting the upper and lower openings, so that seed cannot flow through one upper opening and out the lower opening by gravity.

Flow of the seed through the upper openings 41 and through the discharge openings 42 is secured by means of the upper chain 37 and the lower chain 32, which are oscillated by means of levers at the opposite ends of the hopper box.

This driving mechanism is best illustrated in Figures 3 and 8. In Figure 3 we have illustrated a driving means in which a countershaft 43 is driven through the universal joint 44 to drive a pulley 46, which in turn drives a belt 47 and pulley 48 to drive the main shaft 49. The countershaft 43 is mounted for rotation in a suitable collar 51 on the lower portion of the front wall 18, and the shaft 49 is mounted for rotation in a collar 52 on the upper portion of the front wall 18. The shaft 49 is provided with an eccentric or crank 53. The crank has a cup 54 rotatably mounted thereon through the agency of a ball bearing 56. The cup 54 is connected to eccentric rods 57 and 58 extending horizontally on opposite sides of the cup. These rods are connected to cylinder-like pivots 59 which are pivotally engaged to pins 61, which are in turn received within lever arms 62.

The lever arms 62 are pivotally mounted on bolts 63 which are in turn pivotally engaged to brackets 64 mounted on the opposite ends of the hopper. The lower ends of the opposed rockers or levers 62 are provided with pads at 66 through which bolts 67 and 68 extend, and these bolts have hooks 69 and 71 at their inner ends for engaging the chains 32 and 37.

It is apparent that as the shaft 29 is rotated, a reciprocating motion is set up in the tie rods 57 and 58 which in turn causes the levers 62 at opposite ends of the hopper to oscillate, to in turn oscillate the chains 32 and 37, which thus carry the seed which falls through the openings 41 to the openings 42 so that it may be discharged through these openings.

It is very important to meter the flow of seed through the lower openings 42, and in doing this we provide a series of semi-circular disc valves 81 which are pivotally engaged to the rear wall 19 of the hopper by means of a plurality of bolts 82. These bolts are provided with springs, as illustrated at 83, for holding the valves 81 against the rear wall of the hopper. The valves 81 are rotated by means of valve arms 84, and these valve arms 84 are pivotally engaged to an operating strap 86 which extends along above the entire line of valves and which is connected to each valve.

The operating strap 86 is also pivotally attached by means of a bolt 87 to an operating lever 88, and this operating lever is pivotally engaged at its lower end to the rear wall 19 as by means of bolt 89. A sector 91 is provided beneath the lever 88 and this sector is provided with suitable indicia 92 for indicating to the operator the desired position of the lever for various types of seed.

The drive shaft of the seeder may be driven from a countershaft as illustrated in Figure 3, or driven by a direct drive, as illustrated in Figure 8, depending on the location of the power take-off shaft which is used to drive the seeder.

Although we have described a specific embodiment of our invention, it is apparent that modifications thereof may be made by those skilled in the art. Such modifications may be made without departing from the spirit and scope of our invention as set forth in the appended claims.

We claim as our invention:

1. In a seeder, an elongated hopper to extend transversely of a towing vehicle and the hopper having a substantially vertical front wall and rear wall inclined upwardly and rearwardly, the two walls being in approximate V relation to each other, a drive shaft extending through the front wall, a crank pin on the end of the drive shaft within the hopper, a cup on the crank pin, pull arms extending to the opposite ends of the hopper and through the end walls thereof, levers pivotally mounted at the hopper ends, and a chain mounted on the lower ends of the levers extending lengthwise through the bottom of the hopper to agitate seed and dispensing openings in the bottom of the hopper for feeding seed.

2. In a seeder, an elongated hopper to extend transversely of the towing vehicle and the hopper having a substantially vertical front wall and rear wall inclined upwardly and rearwardly, the two walls being in approximate V relation to each other, a cover over the upper ends of the walls, the cover being inclined rearwardly and downwardly, a drive shaft extending through the front wall, a crank pin on the end of the drive shaft within the hopper, a cup on the crank pin, pull arms extending to the opposite ends of the hopper and through the end walls thereof, levers pivotally mounted at the hopper ends, and chains mounted on the lower ends of the levers extending through the bottom of the hopper to agitate the seed and metering means in the hopper wall for feeding seed.

3. In a seeder adapted to be mounted on a tractor and to be driven by the power take-off of a tractor, a hopper substantially triangular in close section with the front wall thereof in vertical position and the rear wall in inclined position, the front and rear walls joining in a V-shaped structure to form a lower trough, a false bottom also V-shaped in cross section located above the bottom of the hopper, chains disposed within the false bottom and true bottoms and extending lengthwise thereof, the upper or false bottom having a series of openings in the bottom thereof and the wall of the hopper near the lower edge thereof being provided with a series of turned triangular openings disposed at some distance from the first named openings, whereby seed will not flow through the two openings except as moved by the chains, means for operating the chains comprising oppositely disposed levers on the outside of the ends of the hopper, these levers being pivotally engaged to brackets on the opposite ends of the hopper, and hooks at the low ends of the levers for engaging the chains, drive rods extending inwardly from the upper ends of the levers toward the center of the box, and an eccentric at substantially the center of the box for driving the drive rods and providing oscillatory motion of the chains whereby movement of the chains will cause seed to be agitated from the false hopper into the true bottom thence through the triangular openings.

4. In a seeder, a hopper, means for permitting the flow of seed from the hopper comprising a series of openings in the hopper wall near the lower edge thereof, these openings being approximately triangular in shape but with the diverging portions joined by a semi-cylindrical wall, the lower edge of the triangle substantially parallel to the bottom edge of the hopper, and valve means for controlling the flow of seed through the openings comprising a semi-circular valve rotatably mounted on the hopper wall to cover and uncover the opening to varying degrees on rotation of the valve.

5. In a seeder, a hopper, means for permitting the flow of seed from the hopper comprising a series of openings in the hopper wall near the lower edge thereof, these openings being approximately triangular in shape but with the diverging portions joined by a semi-cylindrical wall, the lower edge of the triangle substantially parallel to the bottom edge of the hopper, valve means for controlling the flow of seed through the openings comprising a semi-circular valve rotatably mounted on the hopper wall to cover and uncover the opening to varying degrees on rotation of the valve, means for rotating the valves in unison comprising a strap and lever arms on each of the valves pivotally engaged to the strap, the strap extending in horizontal relation above the valves, and a single operating lever for moving the strap to thus simultaneously rotate the valves.

References Cited in the file of this patent

UNITED STATES PATENTS

| | | |
|---|---|---|
| 2,143,801 | Self | Jan. 10, 1939 |
| 2,486,200 | O'Connor | Oct. 25, 1949 |
| 2,575,985 | Thompson | Nov. 10, 1951 |